United States Patent
Ugarte

(10) Patent No.: US 10,309,254 B2
(45) Date of Patent: Jun. 4, 2019

(54) NOZZLE SEGMENT FOR A GAS TURBINE ENGINE WITH RIBS DEFINING RADIALLY SPACED INTERNAL COOLING CHANNELS

(71) Applicant: General Electric Company, Schenectady, NY (US)

(72) Inventor: Johnnattan Tennessee Ugarte, Mason, OH (US)

(73) Assignee: General Electric Company, Schenectady, NY (US)

(*) Notice: Subject to any disclaimer, the term of this patent is extended or adjusted under 35 U.S.C. 154(b) by 481 days.

(21) Appl. No.: 15/054,434

(22) Filed: Feb. 26, 2016

(65) Prior Publication Data

US 2017/0248031 A1 Aug. 31, 2017

(51) Int. Cl.
*F01D 25/12* (2006.01)
*F01D 9/04* (2006.01)
*F01D 5/02* (2006.01)
*F01D 5/18* (2006.01)
*F01D 5/28* (2006.01)
*F01D 9/02* (2006.01)

(52) U.S. Cl.
CPC ............... *F01D 25/12* (2013.01); *F01D 5/02* (2013.01); *F01D 5/186* (2013.01); *F01D 5/187* (2013.01); *F01D 5/188* (2013.01); *F01D 5/284* (2013.01); *F01D 9/02* (2013.01); *F01D 9/041* (2013.01); *F05D 2220/32* (2013.01); *F05D 2240/35* (2013.01); *F05D 2260/22141* (2013.01); *F05D 2300/6033* (2013.01); *Y02T 50/672* (2013.01); *Y02T 50/676* (2013.01)

(58) Field of Classification Search
CPC .......... F01D 5/188; F01D 5/186; F01D 9/041; F01D 25/12; F02C 3/04; F05D 2300/6033
See application file for complete search history.

(56) References Cited

U.S. PATENT DOCUMENTS

| 4,526,512 A | * | 7/1985 | Hook | F01D 5/188 415/115 |
| 5,752,801 A | * | 5/1998 | Kennedy | F01D 5/187 415/115 |
| 6,325,593 B1 | * | 12/2001 | Darkins, Jr. | F01D 5/186 415/115 |
| 6,616,406 B2 | * | 9/2003 | Liang | F01D 5/186 416/97 R |

(Continued)

*Primary Examiner* — Carlos A Rivera
(74) *Attorney, Agent, or Firm* — Dority & Manning, P.A.

(57) ABSTRACT

A nozzle segment for a gas turbine engine may generally include an airfoil having an exterior surface defining a pressure side and a suction side extending between leading and trailing edges. The airfoil may define an open internal volume within its interior for receiving a cooling medium. The open internal volume may include a primary internal cavity and a plurality of internal cooling channels in flow communication with the primary internal cavity. The primary internal cavity may extend within the interior of the airfoil from a location adjacent to the leading edge to a forward end of each of the internal cooling channels. The internal cooling channels may extend within the interior of the airfoil from the primary internal cavity towards the trailing edge. In addition, the internal cooling channels may be spaced apart radially by a plurality of ribs extending within the interior of the airfoil.

15 Claims, 6 Drawing Sheets

(56) References Cited

U.S. PATENT DOCUMENTS

| | | | | |
|---|---|---|---|---|
| 7,066,717 B2* | 6/2006 | Morrison | ............... | F01D 5/187 |
| | | | | 29/889.71 |
| 7,255,535 B2* | 8/2007 | Albrecht | ............... | F01D 5/187 |
| | | | | 416/97 R |
| 7,549,844 B2* | 6/2009 | Liang | ............... | F01D 5/187 |
| | | | | 415/177 |
| 7,806,658 B2* | 10/2010 | Liang | ............... | F01D 5/187 |
| | | | | 416/97 R |
| 8,096,770 B2* | 1/2012 | Liang | ............... | F01D 5/186 |
| | | | | 415/115 |
| 8,920,111 B2* | 12/2014 | Lee | ............... | F01D 5/187 |
| | | | | 415/115 |
| 9,683,443 B2* | 6/2017 | Freeman | ............... | F01D 5/186 |
| 2002/0164250 A1* | 11/2002 | Chung | ............... | F01D 5/187 |
| | | | | 416/97 R |
| 2017/0145833 A1* | 5/2017 | Thornton | ............... | F01D 5/187 |

* cited by examiner

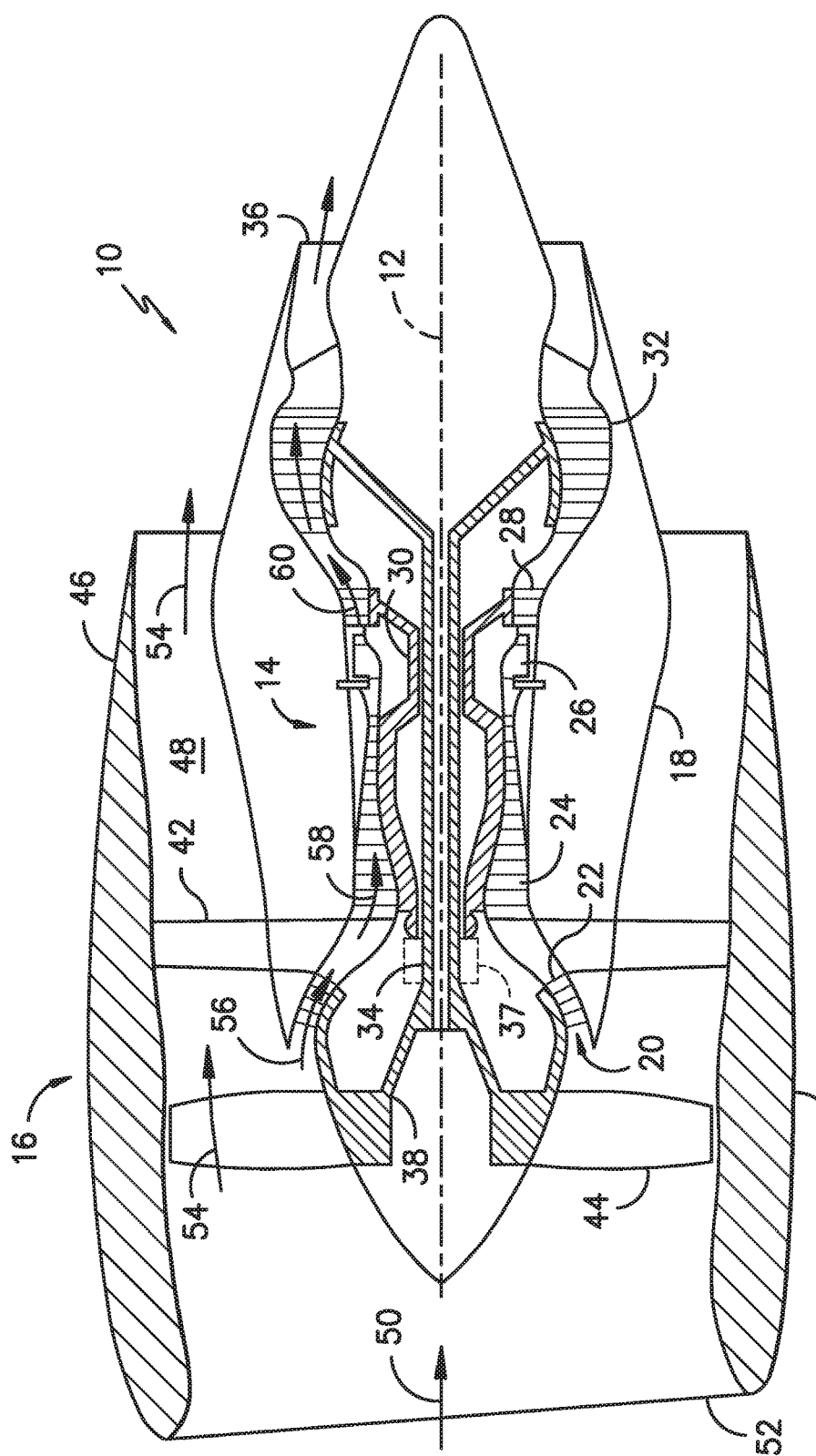
FIG. -1-

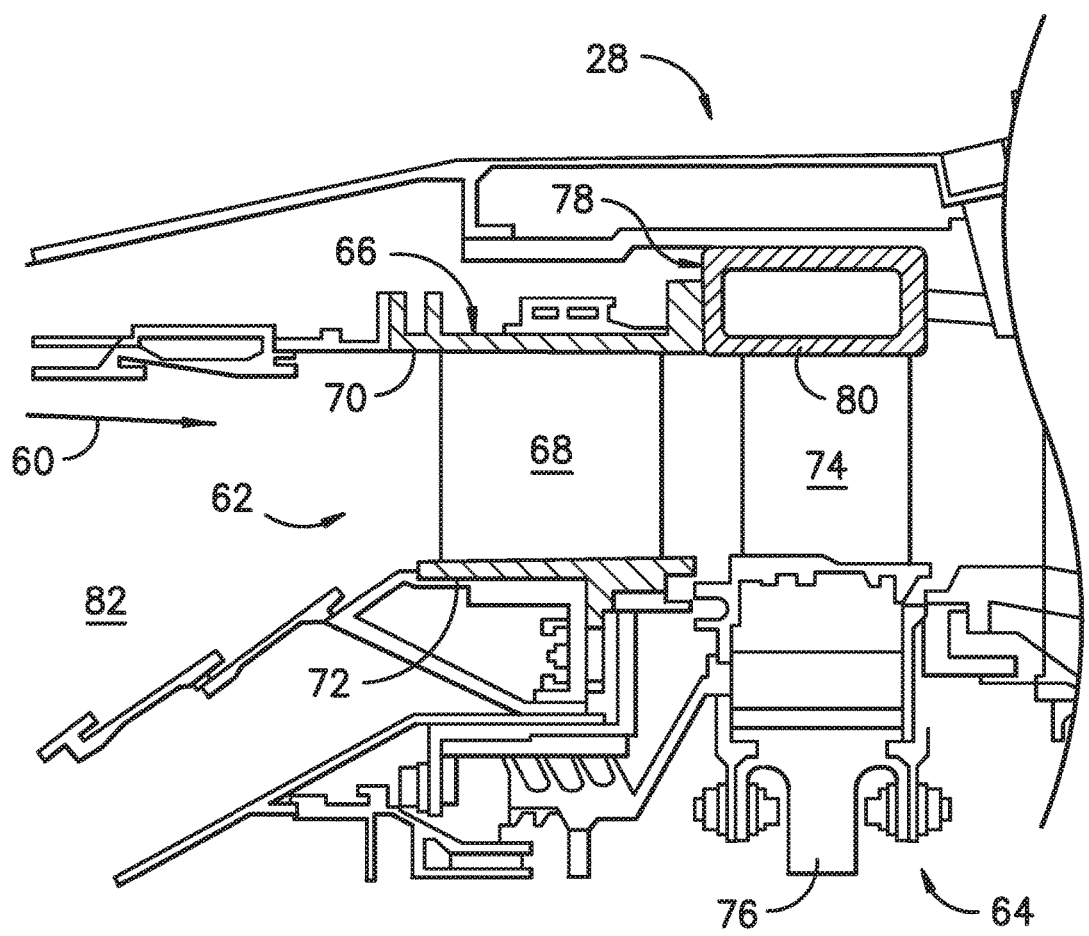
FIG. -2-

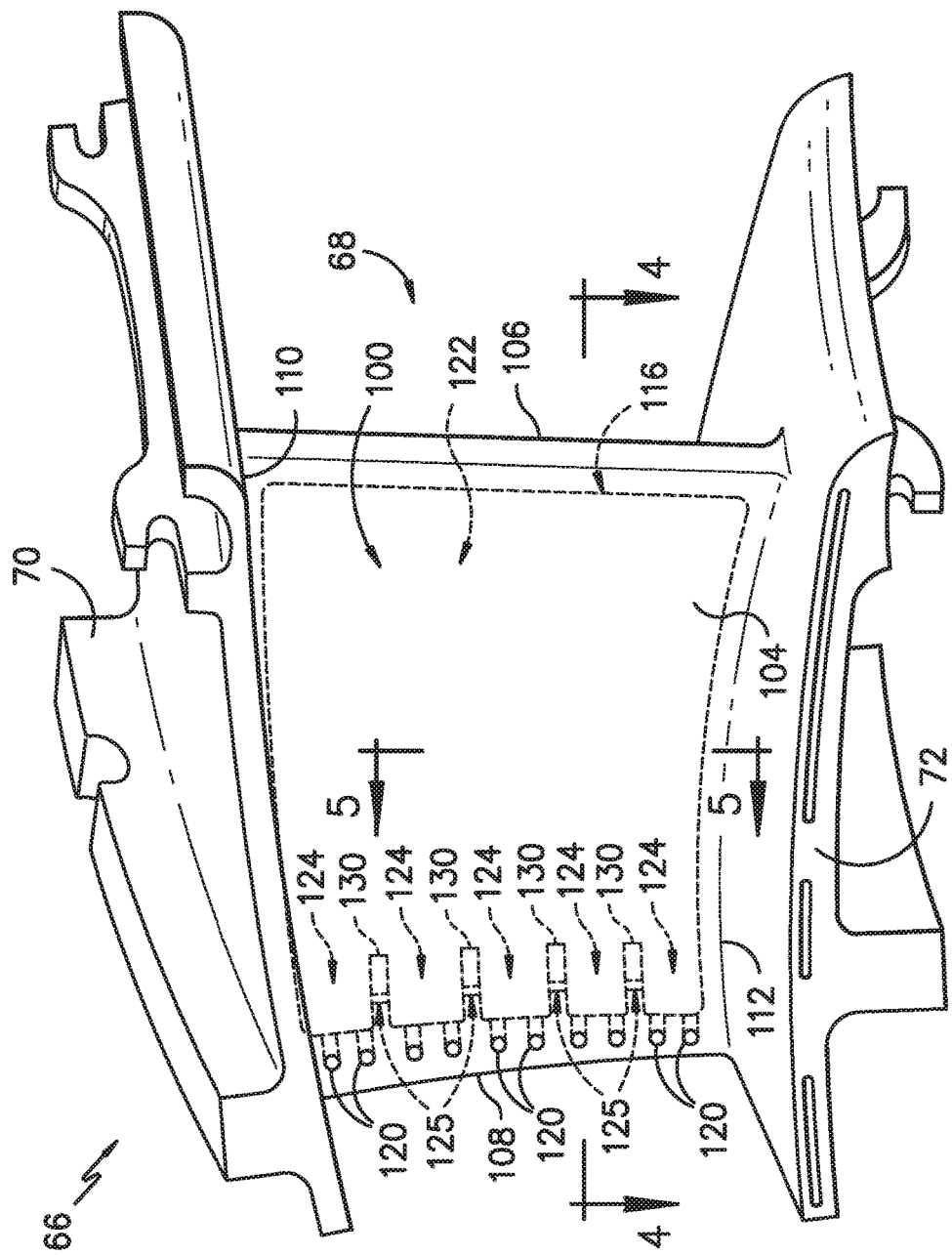
FIG. -3-

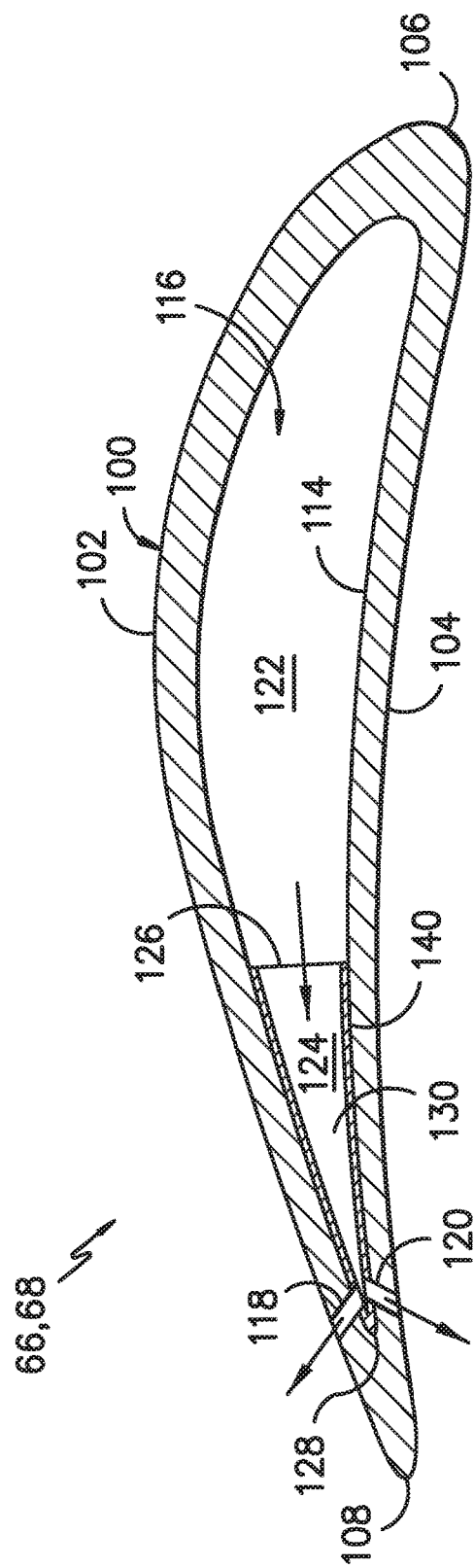
FIG. -4-

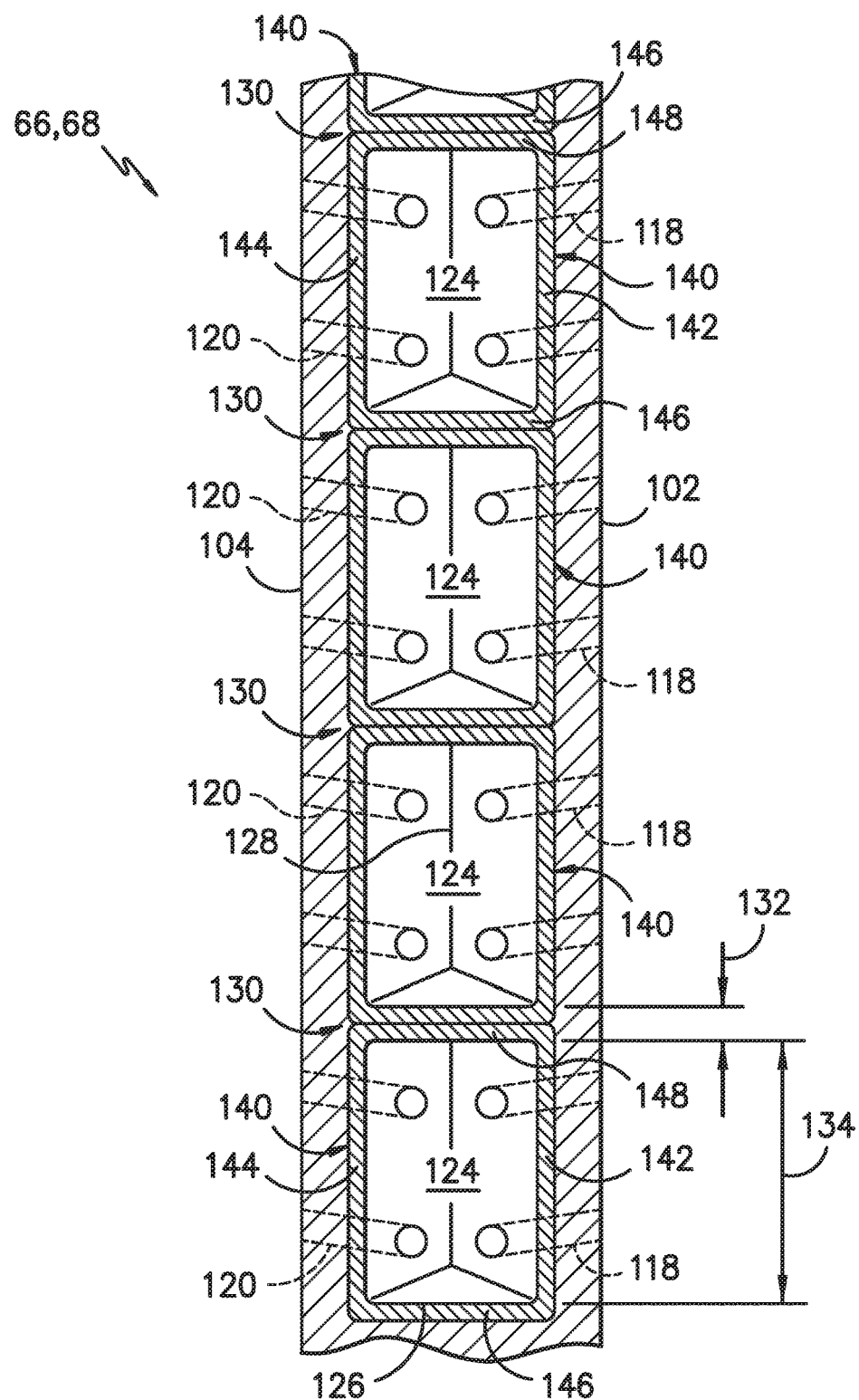
FIG. -5-

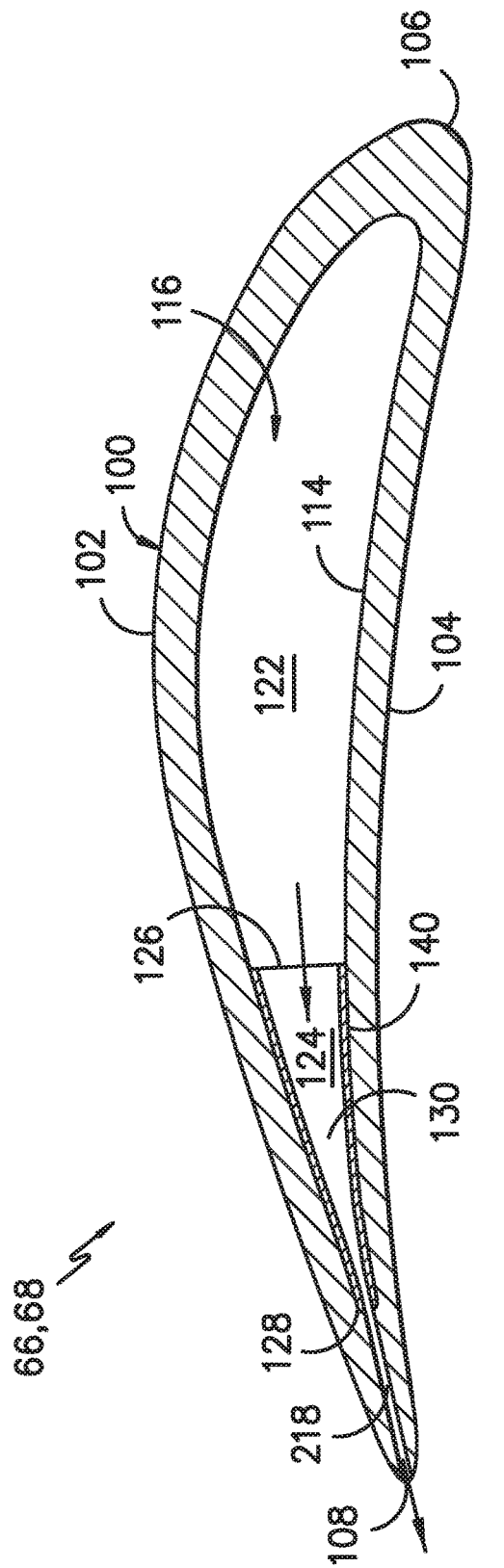
FIG. -6-

NOZZLE SEGMENT FOR A GAS TURBINE ENGINE WITH RIBS DEFINING RADIALLY SPACED INTERNAL COOLING CHANNELS

STATEMENT REGARDING FEDERALLY SPONSORED RESEARCH OR DEVELOPMENT

This invention was made with Government support under Contract No. FA8650-09-D-2922, awarded by the Department of Defense. The Government has certain rights in the invention.

FIELD OF THE INVENTION

The present subject matter relates generally to gas turbine engines and, more particularly, to a nozzle segment for a gas turbine engine defining internal cooling channels adjacent to the trailing edge of its nozzle airfoil that are spaced apart radially along the airfoil by horizontally extending ribs.

BACKGROUND OF THE INVENTION

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components, such as turbine rotor blades, rotor disks and retainers, and various stationary turbine components, such as stator vanes or nozzles, turbine shrouds and engine frames. The rotatable and stationary turbine components at least partially define the hot gas path through the turbine section. As the combustion gases flow through the hot gas path, thermal energy is transferred from the combustion gases to the rotatable turbine components and the stationary turbine components.

Nozzles utilized in gas turbine engines, and in particular HP turbine nozzles, are often arranged as an annular array of nozzle segments, with each nozzle segment including one or more nozzle vanes or airfoils extending between annular inner and outer bands which define the primary flowpath through the nozzles. Due to the operating temperatures within the gas turbine engine, it is generally desirable to utilize materials having a low coefficient of thermal expansion and high compression strength. Recently, for example, ceramic matrix composite ("CMC") materials have been utilized to operate effectively in such adverse temperature and pressure conditions. These low-coefficient-of-thermal-expansion materials have higher temperature capability than similar metallic parts, so that, when operating at the higher operating temperatures, the engine is able to operate at a higher engine efficiency.

Despite their high temperature capabilities, it is often desirable to provide a flow of cooling medium to hot gas path components formed from CMC materials. For instance, CMC-based nozzle designs are known in which the nozzle airfoil defines two radially extending internal cavities, namely a larger forward cavity extending from the airfoil's leading edge towards its trailing edge and a smaller aft cavity positioned between the forward cavity and the trailing edge. The forward and aft internal cavities are separated from one another in a chordwise direction of the airfoil by a vertical rib that extends radially between the two cavities along the radial height of the airfoil. As such, each cavity is separately supplied with cooling medium from a source disposed radially outwardly from the radial outer end of the vertical rib.

Unfortunately, such conventional cooling arrangements exhibit certain disadvantages. For example, the vertical rib dividing the forward and aft cavities generally creates an area of high thermal stress within the airfoil. In addition, the design of the aft cavity within the airfoil is typically limited by the radius of the aft end of such cavity (e.g., the end located closest to the trailing edge of the airfoil). Specifically, as the aft end of the aft cavity is moved closer to the trailing edge of the airfoil, the radius at the aft end must be decreased, thereby increasing the likelihood of failure due to the internal stresses caused by the airfoil "ballooning" during operation of the gas turbine engine. As a result, the aft end of the aft cavity is spaced apart from the trailing edge of the airfoil by a greater chordwise distance than is typically desired for optimal cooling performance so as to prevent the occurrence of airfoil failures.

Accordingly, an improved cooling flow arrangement for an airfoil of a gas turbine nozzle that allows for a cooling medium to be supplied within the airfoil in closer proximity to the trailing edge without increasing the likelihood of a failure occurring would be welcomed within the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a nozzle segment for a gas turbine engine. The nozzle segment may generally be formed from a ceramic matrix composite material and may include an airfoil having an exterior surface defining a pressure side and a suction side extending between a leading edge and a trailing edge. The airfoil may define an open internal volume within its interior for receiving a cooling medium. The open internal volume may include a primary internal cavity and a plurality of internal cooling channels in flow communication with the primary internal cavity. The primary internal cavity may extend within the interior of the airfoil from a location adjacent to the leading edge to a forward end of each of the internal cooling channels. The internal cooling channels may extend within the interior of the airfoil from the primary internal cavity towards the trailing edge. In addition, the internal cooling channels may be spaced apart radially by a plurality of ribs extending within the interior of the airfoil.

In another aspect, the present subject matter is directed to nozzle segment for a gas turbine engine. The nozzle segment may generally be formed from a ceramic matrix composite material and may include an airfoil having an exterior surface defining a pressure side and a suction side extending between a leading edge and a trailing edge. The airfoil may define an open internal volume within its interior for receiving a cooling medium. The open internal volume may include a primary internal cavity extending within the interior of the airfoil in a chordwise direction from a location adjacent to the leading edge. The airfoil may also include a plurality of ribs extending within the interior of the airfoil in the chordwise direction from the primary internal cavity towards the trailing edge. The ribs may be spaced apart from one another within the interior of the airfoil so as to define a plurality of radially spaced internal cooling channels in flow communication with the primary internal cavity.

In a further aspect, the present subject matter is directed to a gas turbine engine. The gas turbine engine may generally include a compressor, a combustor in flow communication with the compressor and a turbine in flow communication with the combustor. The turbine may include a turbine nozzle formed from an annular array of nozzle segments. Each nozzle segment may generally be formed from a ceramic matrix composite material and may include an airfoil having an exterior surface defining a pressure side and a suction side extending between a leading edge and a trailing edge. The airfoil may define an open internal volume within its interior for receiving a cooling medium. The open internal volume may include a primary internal cavity and a plurality of internal cooling channels in flow communication with the primary internal cavity. The primary internal cavity may extend within the interior of the airfoil from a location adjacent to the leading edge to a forward end of each of the internal cooling channels. The internal cooling channels may extend within the interior of the airfoil from the primary internal cavity towards the trailing edge. In addition, the internal cooling channels may be spaced apart radially by a plurality of ribs extending within the interior of the airfoil.

These and other features, aspects and advantages of the present invention will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a cross-sectional view of one embodiment of a gas turbine engine that may be utilized within an aircraft in accordance with aspects of the present subject matter;

FIG. 2 illustrates a cross-sectional view of one embodiment of a turbine configuration suitable for use within the gas turbine engine shown in FIG. 1;

FIG. 3 illustrates a perspective view of one of the nozzle segments of the turbine nozzle shown in FIG. 2, particularly illustrating one embodiment of an internal cooling flow arrangement for the airfoil of the nozzle segment in accordance with aspects of the present subject matter;

FIG. 4 illustrates a cross-sectional view of the nozzle segment shown in FIG. 3 taken about line 4-4, particularly illustrating a primary internal cavity of the cooling flow arrangement and one of a plurality of internal cooling channels of the cooling flow arrangement extending between the primary internal cavity and the trailing edge of the airfoil in accordance with aspects of the present subject matter;

FIG. 5 illustrates a cross-sectional view of the nozzle segment shown in FIG. 3 taken about line 5-5, particularly illustrating the internal cooling channels spaced apart radially along the nozzle airfoil by horizontally extending ribs in accordance with aspects of the present subject matter; and FIG. 6 illustrates another cross-sectional view of the nozzle segment that is similar to the cross-sectional view shown in FIG. 4, particularly illustrating an alternative cooling hole arrangement for supplying a cooling medium between the internal cooling channels and the exterior surface of the nozzle airfoil.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a nozzle segment for a gas turbine engine including radially spaced, internal cooling channels defined adjacent to the trailing edge of the nozzle airfoil. Specifically, in several embodiments, the cooling channels may be in direct flow communication with a forward or primary internal cavity of the airfoil and may be spaced apart radially along the airfoil by horizontally extending ribs that extend between the forward and aft ends of the channels. The horizontal ribs may generally be configured to distribute the stress concentration caused by the airfoil "ballooning" during operation of the gas turbine engine so as to alleviate the local internal stress loads at the aft ends of the cooling channels. As a result, the aft ends of the cooling channels may be located in closer proximity to the trailing edge of the nozzle as compared to conventional designs using a single, radially extending aft cavity, thereby providing for enhanced cooling at the trailing edge.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular compressor inlet 20. In addition, the outer casing 18 may further enclose and support a booster compressor 22 for increasing the pressure of the air that enters the core engine 14 via the compressor inlet 20 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30 and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine 10 as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22 via the compressor inlet 20. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Referring now to FIG. 2, a partial, cross-sectional view of the first (or high pressure) turbine 28 described above with reference to FIG. 1 is illustrated in accordance with embodiments of the present subject matter. As shown, the first turbine 28 may include a first stage turbine nozzle 62 and a first stage turbine rotor 64. The nozzle 62 may generally be defined by an annular flow channel that includes a plurality of radially-extending, circumferentially-spaced nozzle segments 66 (one of which is shown). Each nozzle segment 66 may include one or more nozzle vanes or airfoils 68 supported between an arcuate outer band 70 and an arcuate inner band 72. For instance, in one embodiment, each nozzle segment 66 may include a single airfoil 68 extending between its inner and outer bands 72, 70 (e.g., a singlet configuration), two airfoils 68 extending between its inner and outer bands 72, 70 (e.g., a doublet configuration) or three airfoils 68 extending between its inner and outer bands 72, 70 (e.g., a triplet configuration). As is generally understood, the nozzle segments 66 of the nozzle 62 may be arranged in annular array centered about the rotational axis 12 (FIG. 1) of the engine 10 so as to form a complete 360 degree assembly, with the outer and inner bands 70, 72 of each nozzle segment 66 generally defining the outer and inner radial flow path boundaries, respectively, for the combustion products (indicated by arrow 60) flowing through the nozzle 72 along the hot gas path of the engine 10.

Additionally, the first stage turbine rotor 64 may include a plurality of circumferentially spaced rotor blades 74 (only one of which is shown in FIG. 2) extending radially outwardly from a rotor disk 76 that rotates about the centerline axis 12 (FIG. 1) of the engine 10. Additionally, a turbine shroud 78 may be positioned immediately adjacent to the radially outer tips of the rotor blades 74 so as to define the outer radial flowpath boundary for the combustion products 60 flowing through the turbine rotor 64 along the hot gas path of the engine 10. The turbine shroud 78 may generally be formed by a plurality of arcuate shroud segments 80 (one of which is shown in FIG. 2), with the shroud segments 80 being arranged circumferentially in an annular array about the centerline axis 12 so as to form a complete 360 degree assembly.

During operation, hot gases of combustion 60 may flow in an axial direction from a combustion zone 82 of the combustor 26 (FIG. 1) into the annular, first stage turbine nozzle 62. The airfoils 68 of the nozzle segments 66 included within the first stage turbine nozzle 62 may generally be configured to turn or direct the hot gases so that the flow angularly impinges upon the rotor blades 74 of the first stage rotor 64. The flow of hot gases around the annular array of rotor blades 74 may result in rotation of the turbine rotor 64, which may then rotationally drive the shaft to which the rotor 64 is coupled (e.g., the first drive shaft 30 shown in FIG. 1).

It should be appreciated that, although only the first stage of the high pressure turbine 28 was generally described above, the turbine 28 may also include any number of follow-up stages including any number of corresponding, sequential annular arrays of nozzle segments 66 and turbine blades 74. Similarly, the low pressure turbine 32 (FIG. 1) may also include a similar configuration, with one or more stages of sequential annular arrays of nozzle segments 66 and turbine blades 74.

Referring now to FIGS. 3-5, several views of one embodiment of an internal cooling flow arrangement for a nozzle segment 66 of a gas turbine engine 10 are illustrated in accordance with aspects of the present subject matter. Specifically, FIG. 3 illustrates a perspective view of one of the nozzle segments 66 of the turbine nozzle 62 described above with reference to FIG. 2, particularly illustrating the internal cooling flow arrangement of the nozzle segment 66 in dashed lines. FIG. 4 illustrates a cross-sectional view of the nozzle segment 66 shown in FIG. 3 taken about line 4-4. Additionally, FIG. 5 illustrates a cross-sectional view of the nozzle segment 66 shown in FIG. 3 taken about line 5-5.

As indicated above, the nozzle segment 66 may generally include one or more nozzle vanes or airfoils 68 extending radially between a radially outer band 70 and a radially inner band 72. As shown in FIG. 3, the nozzle segment 66 has a singlet configuration and, thus, includes a single airfoil 68 extending between the inner and outer bands 72, 70. However, in other embodiments, the nozzle segment 66 may have any other suitable airfoil configuration, such as a doublet configuration or a triplet configuration.

It should be appreciated that the nozzle segment 66 may generally be formed from any suitable material. However, in several embodiments, the nozzle segment 66 may be formed from a non-metallic composite material. For instance, in a particular embodiment, the nozzle segment 66 may be formed from a ceramic matrix composite (CMC) material. In such an embodiment, the CMC material used to form the nozzle segment 66 may generally correspond to any suitable CMC material known in the art and, thus, may generally include a ceramic matrix having a suitable reinforcing material incorporated therein to enhance the material's properties (e.g., the material strength and/or the thermo-physical properties). In one embodiment, the CMC material used may be configured as a continuous fiber reinforced CMC material. For example, suitable continuous fiber reinforced CMC materials may include, but are not limited to, CMC materials reinforced with continuous carbon fibers, oxide fibers, silicon carbide monofilament fibers and other CMC materials including continuous fiber lay-ups and/or woven fiber preforms. In other embodiments, the CMC material used may be configured as a discontinuous reinforced CMC material. For instance, suitable discontinuous reinforced CMC materials may include, but are not limited to, particulate, platelet, whisker, discontinuous fiber, in situ and nano-composite reinforced CMC materials.

As shown in the illustrated embodiment, the nozzle airfoil 68 may generally include an exterior surface 100 defining a pressure side 102 and a suction side 104 extending between a leading edge 106 and a trailing edge 108. Additionally, the nozzle airfoil 68 may generally extend radially between a radially outer end 110 terminating at the outer band 70 and a radially inner end 112 terminating at the inner band 72. As is generally understood, at least a portion of the airfoil 68 may be hollow to allow a cooling medium (e.g., air) to be supplied within its interior. For example, as particularly shown in FIG. 4, the airfoil may include an interior surface 114 defining an open internal volume 116. As such, a cooling medium supplied within the interior of the airfoil 68 may be circulated throughout the open internal volume 116 to provide cooling to the walls of the airfoil 68 defined between exterior and interior surfaces 100, 114 and/or to provide cooling to the exterior surface 100 of the airfoil 68 (e.g., via one or more cooling holes 118, 120 defined between the open interior volume 116 and the exterior surface 100).

In several embodiments, the open interior volume 116 defined by the nozzle airfoil 68 may include a primary internal cavity 122 and a plurality of internal cooling channels 124 provided in flow communication with the primary internal cavity 122. For example, as particularly shown in FIG. 4, the primary internal cavity 122 may be defined within the airfoil 68 so as extend in a chordwise direction (defined between the leading and trailing edges 106, 108 of the airfoil 68) from a location within the interior of the airfoil 68 generally adjacent to the leading edge 106 to a forward end 126 of each internal cooling channel 124. Additionally, as shown in FIG. 2, each cooling channel 124 may be defined within the airfoil 68 so as to extend from its forward end 126 to an aft end 128 located generally adjacent to the trailing edge 108 of the airfoil 68. As such, when a cooling medium is supplied into the primary internal cavity 122 of the airfoil 68 (e.g., via a supply opening (not shown) defined through the outer band 70), the cooling medium may be directed through the primary internal cavity 122 and subsequently flow into each of the internal cooling channels 124. For instance, the cooling medium may be directed from the primary internal cavity 122 into each internal cooling channel 124 at its forward end 126 and may then flow aft in the chordwise direction through the cooling channel 124 towards its aft end 128.

As shown in the illustrated embodiment, the various internal cooling channels 124 may be defined within the airfoil 68 so as to be spaced apart radially between the radially inner and outer ends 112, 110 of the airfoil 68. Specifically, as indicated above, the internal cooling channels 124 may be spaced apart radially by a plurality of horizontally extending ribs 130 included within the interior of the airfoil 68. For example, as shown in FIGS. 3 and 5, each pair of adjacent cooling channels 124 may be separated by a common rib 130 extending radially between the channels 124. In one embodiment, each rib 130 may be configured to fluidly isolate its adjacent cooling channels 124. For instance, as shown in the illustrated embodiment, each rib 130 may be configured to extend in the chordwise direction of the airfoil 68 between the forward and aft ends 126, 128 of the adjacent cooling channels 124, thereby forming a fluid divider along the chordwise lengths of the cooling channels 124. However, in other embodiments, each rib 130 may define one or more radially extending passages 125 between its adjacent cooling channels 124 to provide a flow path for cooling medium between such channels 124.

As described above, the ribs 130 may allow for the internal stresses caused by airfoil "ballooning to be distributed radially along the airfoil 68, thereby reducing the local stress loads at the aft ends 128 of the cooling channels 124. As a result, the cooling channels 124 may be configured to extend further aft than conventional designs without any increased risk of failure, thereby providing a means to increase the flow of cooling medium to locations within the airfoil 68 in close proximity to its trailing edge 108.

In one embodiment, the ribs 130 may be formed integrally with the surrounding airfoil structure (e.g., the pressure and suction side walls of the airfoil 68) such that the outer perimeter of each cooling channel 124 is defined by the walls/ribs of the airfoil 68. Alternatively, the cooling channels 124 may be defined by one or more channel members 140 configured to be positioned and/or installed within the interior of the airfoil 68 between its pressure and suction side walls. For instance, as particularly shown in FIG. 5, each cooling channel 124 may, in one embodiment, be defined by a separate channel member 140 extending in a widthwise direction between a first side 142 positioned adjacent to the inner surface 114 of the pressure side wall and a second side 144 positioned adjacent to the inner surface 114 of the suction side wall and in a radial direction between an inner end 146 and an outer end 148. In such an embodiment, the channel members 140 may be positioned one on top of another within the interior of the airfoil 68 such that each rib 130 is formed by the adjacent radial ends 146, 148 of each pair of adjacent channel members 140 (e.g., the inner end 146 of one of the channel members 140 and the outer end 148 of an adjacent channel member 140). In another embodiment, two or more of the cooling channels 124 may be formed by a common channel member 140 configured to be positioned and/or installed within the interior of the airfoil 68 between its pressure and suction side walls. For instance, a single channel member 140 may be installed within the interior of the airfoil 68 that defines each of the cooling channels 124 and associated ribs 130.

It should be appreciated that, in general, the channel member(s) 140 may be formed from any suitable material and/or by using any suitable process. For example, in several embodiments, each channel member 140 may be formed from a suitable fiber-reinforced composite material, such as a carbon or glass fiber-reinforced composite material. For instance, one or more fabric plies may be wrapped in a suitable manner to form a channel member 140 defining the desired shape of each cooling channel 124, such as by shaping suitable ply packs to form each channel member 140. In another embodiment, discontinuous materials, such as short or chopped fibers, particulates, platelets, whiskers, etc., may be dispersed throughout a suitable matrix material and used to form each channel member 140. Alternatively, each channel member 140 may be formed from any other suitable material, such as a metallic-based material.

Additionally, it should be appreciated that, in several embodiments, each channel member 140 may correspond to a pre-fabricated component. In such embodiments, the channel member(s) may be installed within the interior of the airfoil 68 during or following manufacturing of the nozzle segment 68. Alternatively, each channel member 140 may be assembled or otherwise formed within the airfoil 68. For instance, when the channel member(s) 140 is formed from one or more fabric plies, the plies may be laid up within the airfoil 68 together with the plies being used to create the airfoil structure.

It should also be appreciated that, in one embodiment, the ribs 130 may be configured to define a relatively small radial dimension relative to the radial dimensions of the cooling channels 124. Specifically, as shown in FIG. 5, a radial thickness 132 of each rib 130 may be significantly less than a radial height 134 of each cooling channel 124. For instance, the ratio between the radial height 134 of each cooling channel 124 and the radial thickness 132 of each rib 130 may be greater than 2:1, such as greater than 3:1 or greater than 4:1 or greater than 5:1.

As indicated above, the cooling medium supplied within the interior of the airfoil 68 may be directed to the exterior of the airfoil 68 via one or more cooling holes 118, 120 to allow for enhanced cooling of the exterior surface 100 of the airfoil 68, particularly adjacent to the trailing edge 108. For instance, as shown in the illustrated embodiment, a plurality of cooling holes 118, 120 may be defined between the internal cooling channels 124 and the exterior surface 100 to allow the cooling medium to be directed to the exterior of the airfoil 68. Specifically, in one embodiment, a plurality of first and second cooling holes 118, 120 may be defined within the airfoil 68 such that each first cooling hole 118 extends between one of the internal cooling channels 124 and the pressure side 102 of the airfoil 68 and each second cooling hole 120 extends between one of the internal cooling channels 124 and the suction side 104 of the airfoil 68. As such, the cooling medium supplied into each cooling channel 124 from the primary internal cavity 122 may be directed through the first and second cooling holes 118, 120 and expelled along the pressure and suction sides 102, 104 of the airfoil 68 to provide a cooling flow along the sides towards the trailing edge 108.

Alternatively, the cooling holes may be defined in the airfoil 68 at any other suitable location. For instance, FIG. 6 illustrates a cross-sectional view of the nozzle segment 66 described above that is similar to the cross-sectional view shown in FIG. 4, particularly illustrating an alternative cooling hole arrangement for the nozzle segment 66. Specifically, as shown, the nozzle segment 66 includes cooling holes 218 defined directly between the internal cooling channels 124 and the trailing edge 108 of the airfoil 68. As such, the cooling medium supplied into each cooling channel 124 from the primary internal cavity 122 may flow through the cooling holes 218 directly to the trailing edge 108 of the airfoil 68.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A nozzle segment for a gas turbine engine, the nozzle segment comprising:

an airfoil formed from a ceramic matrix composite material, the airfoil including an exterior surface defining a pressure side and a suction side extending between a leading edge and a trailing edge, the airfoil defining an open internal volume within an interior of the airfoil for receiving a cooling medium, the open internal volume including a primary internal cavity and a plurality of internal cooling channels in flow communication with the primary internal cavity, the primary internal cavity extending within the interior of the airfoil from a location adjacent to the leading edge to a forward end of each of the plurality of internal cooling channels, the plurality of internal cooling channels extending within the interior of the airfoil from the primary internal cavity towards the trailing edge, wherein the plurality of internal cooling channels are spaced apart radially by a plurality of ribs extending within the interior of the airfoil; and at least one channel member positioned within the interior of the airfoil, the at least one channel member defining an outer perimeter of each internal cooling channel, wherein the at least one channel member comprises a plurality of channel members, each channel member of the plurality of channel members defining one of the plurality of internal cooling channels, and wherein the plurality of channel members are positioned one on top of another within the interior of the airfoil, each rib being formed by adjacent radial ends of each pair of adjacent channel members of the plurality of channel members.

2. The nozzle segment of claim 1, wherein each rib is configured to extend in a chordwise direction between an adjacent pair of internal cooling channels of the plurality of internal cooling channels.

3. The nozzle segment of claim 2, wherein each internal cooling channel extends in the chordwise direction between the forward end and an aft end disposed between the forward end and the trailing edge, each rib being configured to extend in the chordwise direction between the adjacent pair of internal cooling channels such that the plurality of internal cooling channels are fluidly isolated from one another between the forward end and the aft end of each respective internal cooling channel of the plurality of internal cooling channels.

4. The nozzle segment of claim 1, wherein the at least one channel member is formed from one or more fabric plies.

5. The nozzle segment of claim 1, wherein the airfoil further defines at least one cooling hole extending between an internal cooling channel of the plurality of cooling channels and the exterior surface.

6. The nozzle segment of claim 5, wherein the at least one cooling hole is defined between the internal cooling channel and at least one of the pressure side or the suction side of the airfoil.

7. The nozzle segment of claim 6, wherein the at least one cooling hole comprises a first cooling hole and a second cooling hole, the first cooling hole being defined between the internal cooling channel and the pressure side of the airfoil, the second cooling hole being defined between the internal cooling channel and the suction side of the airfoil.

8. The nozzle segment of claim 5, wherein the at least one cooling hole is defined directly between the internal cooling channel and the trailing edge of the airfoil.

9. The nozzle segment of claim 1, wherein a radial thickness of each rib is less than a radial height of each of the plurality of internal cooling channels.

10. A nozzle segment for a gas turbine engine, the nozzle segment comprising:
an airfoil formed from a ceramic matrix composite material, the airfoil including an exterior surface defining a pressure side and a suction side extending between a leading edge and a trailing edge, the airfoil defining an open internal volume within an interior of the airfoil for receiving a cooling medium, the open internal volume including a primary internal cavity extending within the interior of the airfoil in a chordwise direction from a location adjacent to the leading edge, the airfoil further including a plurality of ribs extending within the interior of the airfoil in the chordwise direction from the primary internal cavity towards the trailing edge, wherein the plurality of ribs are spaced apart from one another within the interior of the airfoil so as to define a plurality of radially spaced internal cooling channels in flow communication with the primary internal cavity; and
wherein each rib is formed from at least one channel member positioned within the interior of the airfoil, the at least one channel member defining an outer perimeter of each internal cooling channel, and wherein the at least one channel member comprises a plurality of channel members, each channel member of the plurality of channel members defining one of the plurality of internal cooling channels, and wherein the plurality of channel members are positioned one on top of another within the interior of the airfoil, each rib being formed by adjacent ends of each pair of adjacent channel members of the plurality of channel members.

11. The nozzle segment of claim 10, wherein each rib is configured to extend in the chordwise direction between an adjacent pair of internal cooling channels of the plurality of internal cooling channels.

12. The nozzle segment of claim 10, wherein the at least one channel member is formed from one or more fabric plies.

13. The nozzle segment of claim 10, wherein the airfoil further defines at least one cooling hole extending between an internal cooling channel of the plurality of cooling channels and the exterior surface.

14. A gas turbine engine, comprising:
a compressor:
a combustor in flow communication with the compressor; and
a turbine in flow communication with the combustor, the turbine including a turbine nozzle formed from an annular array of nozzle segments, each nozzle segment comprising:
an airfoil formed from a ceramic matrix composite material, the airfoil including an exterior surface defining a pressure side and a suction side extending between a leading edge and a trailing edge, the airfoil defining an open internal volume within an interior of the airfoil for receiving a cooling medium, the open internal volume including a primary internal cavity and a plurality of internal cooling channels in flow communication with the primary internal cavity, the primary internal cavity extending within the interior of the airfoil from a location adjacent to the leading edge to a forward end of each of the plurality of internal cooling channels, the plurality of internal cooling channels extending within the interior of the airfoil from the primary internal cavity towards the trailing edge,
wherein the plurality of internal cooling channels are spaced apart radially by a plurality of ribs extending within the interior of the airfoil; and
wherein each rib is formed from at least one channel member positioned within the interior of the airfoil, the at least one channel member defining an outer perimeter of each internal cooling channel, and wherein the at least one channel member comprises a plurality of channel members, each channel member of the plurality of channel members defining one of the plurality of internal cooling channels, and wherein the plurality of channel members are positioned one on top of another within the interior of the airfoil, each rib being formed by adjacent ends of each pair of adjacent channel members of the plurality of channel members.

15. The gas turbine engine of claim 14, wherein each of the plurality of ribs define a radial passage that extends between adjacent internal cooling channels of the plurality of internal cooling channels.

* * * * *